(12) United States Patent
Sasson et al.

(10) Patent No.: US 7,263,144 B2
(45) Date of Patent: Aug. 28, 2007

(54) METHOD AND SYSTEM FOR DIGITAL EQUALIZATION OF NON-LINEAR DISTORTION

(75) Inventors: Nir Sasson, Ein-Sarid (IL); Adam Lapid, Shoham (IL); Alon Elhanati, Tel Aviv (IL)

(73) Assignee: Texas Instruments Incorporated, Dallas, TX (US)

( * ) Notice: Subject to any disclaimer, the term of this patent is extended or adjusted under 35 U.S.C. 154(b) by 844 days.

(21) Appl. No.: 10/105,533

(22) Filed: Mar. 20, 2002

(65) Prior Publication Data

US 2003/0016741 A1    Jan. 23, 2003

Related U.S. Application Data

(60) Provisional application No. 60/277,177, filed on Mar. 20, 2001.

(51) Int. Cl.
    *H04L 27/08*      (2006.01)
(52) U.S. Cl. ...................................................... 375/345
(58) Field of Classification Search ................ 375/219, 375/222, 285, 295, 296, 297, 345, 229, 316; 455/39, 63, 232.1–239; 332/123, 124, 125; 329/318–321
See application file for complete search history.

(56) References Cited

U.S. PATENT DOCUMENTS

| 3,600,681 | A |  | 8/1971 | Arbuckle |  |
|---|---|---|---|---|---|
| 4,181,888 | A |  | 1/1980 | Falconer |  |
| 4,213,095 | A |  | 7/1980 | Falconer |  |
| RE31,351 | E |  | 8/1983 | Falconer |  |
| 4,615,038 | A | * | 9/1986 | Lim et al. | 375/232 |
| 5,107,520 | A | * | 4/1992 | Karam et al. | 375/296 |
| 5,148,448 | A | * | 9/1992 | Karam et al. | 375/298 |
| 5,311,557 | A | * | 5/1994 | Betts et al. | 375/341 |
| 5,343,500 | A | * | 8/1994 | Betts et al. | 375/262 |
| 6,181,201 | B1 | * | 1/2001 | Black | 330/129 |
| 6,252,912 | B1 | * | 6/2001 | Salinger | 375/278 |
| 6,298,097 | B1 | * | 10/2001 | Shalom | 375/297 |
| 6,429,740 | B1 | * | 8/2002 | Nguyen et al. | 330/149 |
| 6,680,648 | B2 | * | 1/2004 | Nguyen et al. | 330/149 |
| 6,697,436 | B1 | * | 2/2004 | Wright et al. | 375/296 |
| 6,785,342 | B1 | * | 8/2004 | Isaksen et al. | 375/284 |

OTHER PUBLICATIONS

Han et al., "Simultaneous Predistortion and Nonlinear Detection for Nonlinear Distorted OFDM signals," IEEE.*

"An Adaptive Data Predistorter for Compensation of Nonlinear Distortion in OFDM Systems", IEEE Transactions on Comm., vol. 45, No. 10, Oct. 1997; pp. 1167-1171, S 0090-6778(97) 07270-X, (W. G. Jeon, K. H. Chang, and Yong Soo Cho).

(Continued)

Primary Examiner—Tesfaldet Bocure
(74) Attorney, Agent, or Firm—Steven A. Shaw; W. James Brady; Frederick J. Telecky, Jr.

(57) ABSTRACT

A method is provided for equalization of nonlinear distortion in a distorted signal comprising the steps of: digitizing the distorted signal and passing the digitized distorted signal through an inverse non-linear transfer function to equalize the nonlinear distortion. Other systems and methods are disclosed.

11 Claims, 7 Drawing Sheets
(3 of 7 Drawing Sheet(s) Filed in Color)

OTHER PUBLICATIONS

"Nonlinearity Compensation in Digital Radio Systems", IEEE Transactions on Comm., vol. 42, No. 2/3/4, Apr. 1994, pp. 988-999, (G. Lazzarin, S. Pupolin, and A. Sarti).

"A Data Predistortion Technique with Memory for QAM Radio Systems", IEEE Transactions on Comm., vol. 39, No. 2, Feb. 1991, pp. 336-344, IEEE Log No. 9038370, (G. Karam and H. Sari).

"Adaptive Linearization of Power Amplifiers in Digital Radio Systems", Bell System Tech. Jr., vol. 62, No. 4, Apr. 1983; pp. 1019-1033, (A.A.M. Saleh and J. Salz).

"Adaptive Equalization of Channel Nonlinearities in QAM Data Transmission Systems", Bell System Tech. Jr. vol. 57, No. 7, Sep. 1978, pp. 2589-2611, (D.D. Falconer).

"A Scheme for Digital Adaptive Pre-Correction for Power Amplifiers in 1024-QAM Radio Link Systems", Sep. 13, 2000, published on website: http://www.cefriel.polimi.it/units/resources/default.xml?id-1&aid=10, (S. Gulino, A. Leva, G. Redaelli, and A. Spalvieri).

"Analysis of Two Digital Adaptive Pre-Correctors for Nonlinearity in OFDM Systems", Jun. 7, 1999, published on website: http://www.cefriel.polimi.it/units/resources/default.xml?id-1&aid=10, (G. Redaelli, D. Colonna, M. Corvino, A. Leva, V. Paderni, and A. Spalvieri).

"Maximum Likelihood Receivers for Data Sequences Transmitted over Nonlinear Channels", A.E.T. vol. 34, pp. 216-223, 1980 , (W. Van Etten and F. Van Vugt).

"Nonlinear Equalization of Digital Satellite Channels", IEEE J. Select Areas Comm., vol. SAC-1, No. 1, pp. 57-62, Jan. 1983, (S. Benedetto and E. Biglieri).

"Adaptive Cancellation of Nonlinear Intersymbol Interference for Voiceband Data Transmission", IEEE J. Select. Areas Comm., vol. SAC-2, pp. 765-777, Sep. 1984, (E. Biglieri, A. Gersho, R. Gitlin and T. Lim).

* cited by examiner

METHOD AND SYSTEM FOR DIGITAL EQUALIZATION OF NON-LINEAR DISTORTION

PRIORITY

This application is non-provisional of and claims priority from the Provisional Patent Application Ser. No.: 60/277,177 filed on Mar. 20, 2001, which is incorporated herein by reference in its entirety for all purposes.

FIELD OF THE INVENTION

This invention generally relates to communication systems, and more specifically to methods of distortion equalization and related systems.

BACKGROUND OF THE INVENTION

Non-linear distortion in receiver's analog front end is characterized by its non-linear transfer function. The overall system non-linear transfer function is described in FIG. 1.

Figure 1:
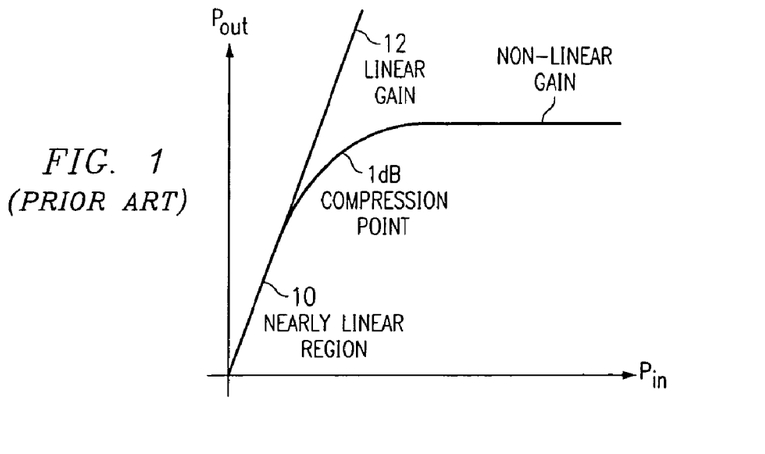
FIG. 1 illustrates a non-linear transfer function.

The non-linear transfer function can be modeled, in its nearly linear region 10, with the following model:

$$Y(X) = A_1 \cdot X + A_2 \cdot X^2 + A_3 \cdot X^3 + \ldots$$

Where $A_1$ is the linear gain 12 of the system, $A_2$ is the second order non-linear coefficient and the $A_3$ is the third order non-linear coefficient. Higher order powers of X are negligible in this region in terms of their contribution to the distortion of the signal passing through the non-linear system.

Figure 2A:
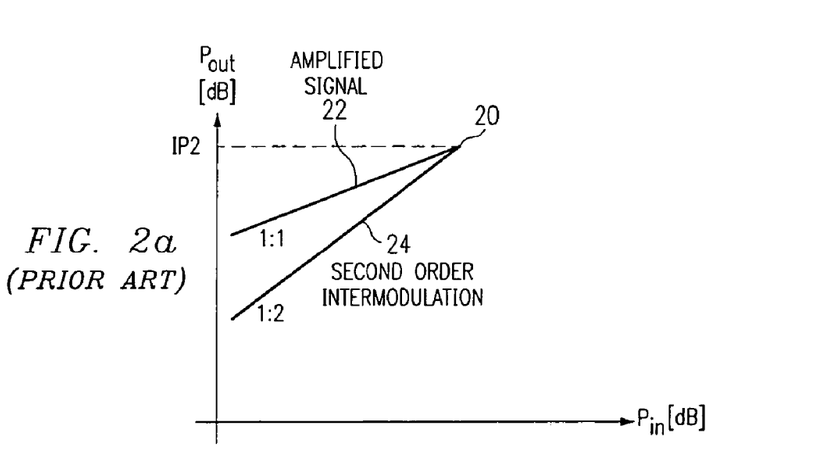
FIGS. 2a and 2b illustrate a non-linear $2^{nd}$ and $3^{rd}$ order distortion model, respectively.
Figure 2B:
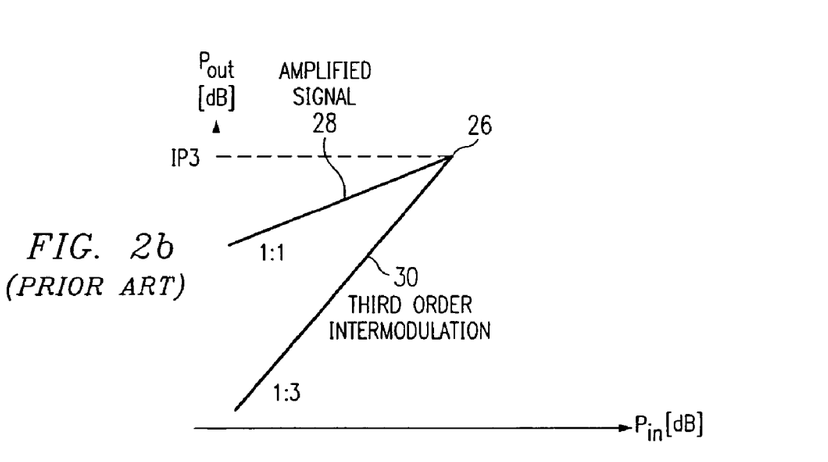

Generally the second and third order distortions are characterized by an intercept point, which indicates the output power of the non-distorted signal 22,28 when equal in power to the non-linear distortion product 24,30. For example, the third order intercept point 26, denoted by IP3, indicates the output power of the non-distorted signal 28 when equal in power to the third order intermodulation 30. This output power point is never to be attained.

The third order intermodulation 30, characterized by the input power and the IP3 26 and the corresponding second order intermodulation 24 characterized by the input power and IP2 20 are described in FIGS. 2b and 2a, respectively.

The intermodulation product concept of IP3 26 and IP2 20 has been generally developed for 2-tone sine wave input scenarios. However the non-linear transfer function also applies to both multiple sine wave input and wideband signals. Using the 2 tone input signal model, the relation between the IP2 20 and IP3 26 and the non-linear coefficients $A_2$ and $A_3$ can be derived yielding the following relations:

$$A_1 = 10^{(Gain/20)} \quad A_2 = -\sqrt{\frac{A_1^4}{2 \cdot IP_2 \cdot Z_{in}}} \quad A_3 = -\frac{A_1^3}{3 \cdot IP_3 \cdot Z_{in}}$$

Figure 3:
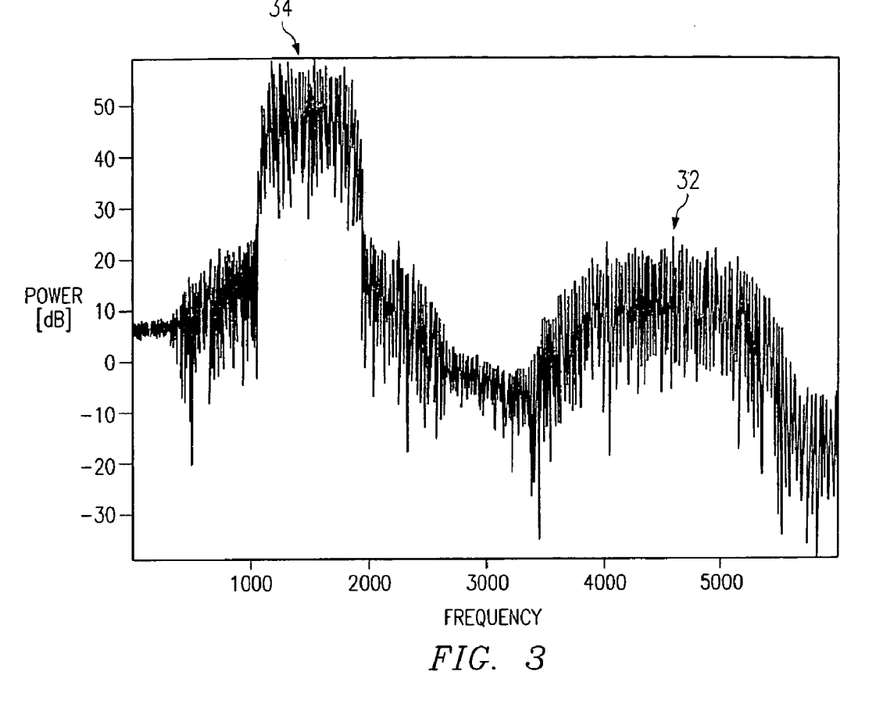
FIG. 3 illustrates $3^{rd}$ order distortion in a wideband signal.
Figure 4A:
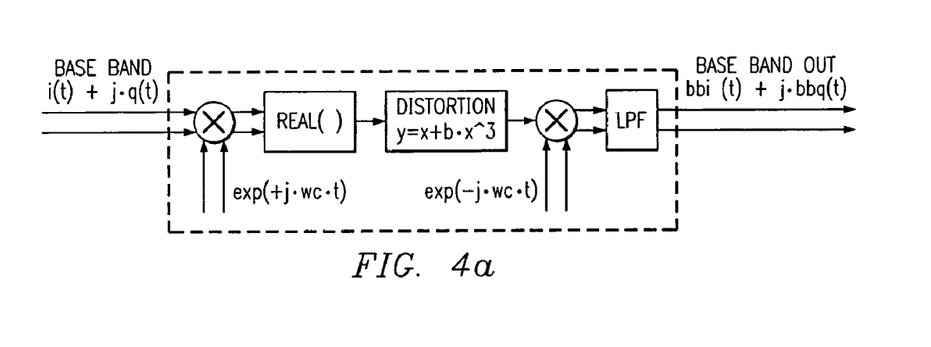
FIGS. 4a-4d illustrate an exemplary baseband model.
Figure 4B:
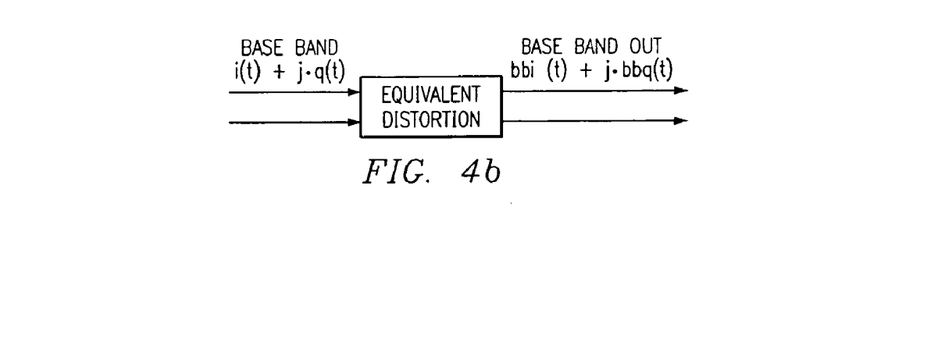
Figure 4C:
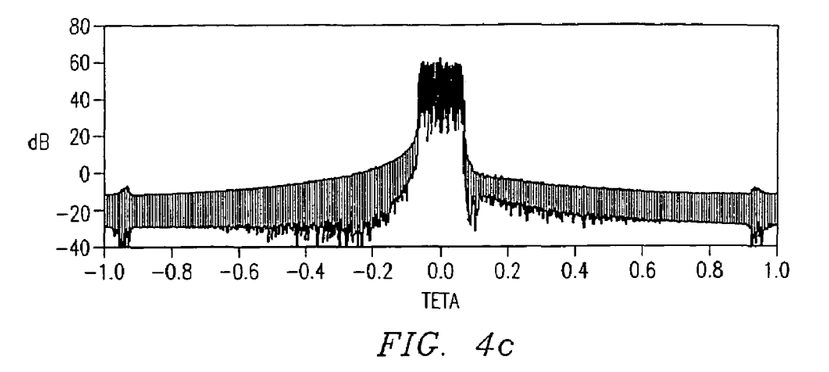
Figure 4D:
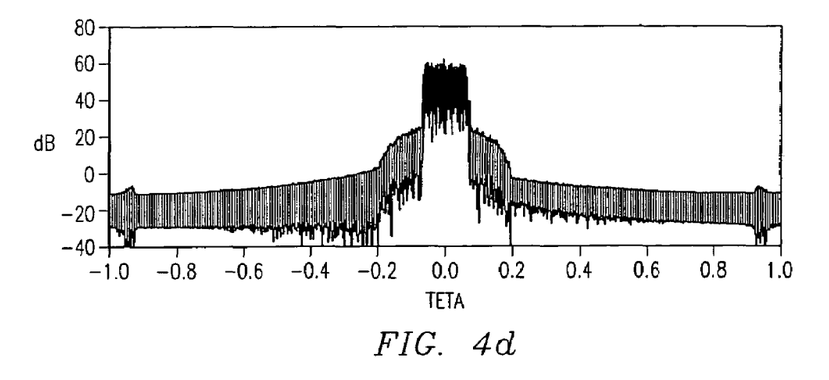

Where,
Gain—is the system linear gain in dB.
$IP_2$—is the system output $2^{nd}$ order intercept point
$IP_3$—is the system output 3rd order intercept point
$Z_{in}$—is the system impedance The intermodulation distortion products of 2 sine wave tones in frequencies $f_1$ and $f_2$ are located at frequencies $m \cdot f_1 \pm n \cdot f_2$ where the $|m|+|n|$ defines the order of the distortion, e.g. for third order distortion the intermodulation products are at frequencies $2 \cdot f_1 - f_2$, $2 \cdot f_2 - f_1$, $2 \cdot f_1 + f_2$ and $2 \cdot f_2 + f_1$. This means that generally second order distortion can be filtered since the distortion frequencies are located outside the signal while third order distortion can not be filtered in a conventional way, especially in wideband signal case, since the distortion may be located inside the signal bandwidth. An example for a distorted wideband signal is shown in FIG. 3 where a wideband distortion 32 is centered at 3 times the signal center frequency and a wideband distortion 34 is on the original signal.

SUMMARY OF THE INVENTION

In general, and in a form of the present invention methods and systems for digital equalization of non-linear distortion are provided. In an embodiment of the invention, the method is applied to equalization of $3^{rd}$ order harmonic intermodulation products. In an embodiment, the invention utilizes the non-linear transfer function to eliminate distortion.

An exemplary system may include a non-linear analog module and a digital core. The digital core may be used to implement an inverse or approximated inverse function of the non-linear analog transfer function to equalize the non-linearity of the analog module, thus yielding overall approximated linear system performance.

The digital equalization can be done, for example, with pre-distortion or post-distortion depending on the application and system. The distortion equalization can be applied to $3^{rd}$ order distortion as well as other order distortion (e.g. $2^{nd}$, $4^{th}$, $5^{th}$ orders). The estimation can also be done in systems with distortion induced by other signals such as those in adjacent channels. In an embodiment of the present invention, other signals such as adjacent signals are not filtered in order to equalize non-linearity induced on the main signal by such other signals.

The digital inverse function yielding the non-linear equalization can be done various ways. For example, an approximated polynomial of the inverse function or a table approximating the inverse function may be used. The estimation of the parameters for the inverse function (or approximated one) can also be done, for example, using a test signal or the original modulated signal. The estimation can be done dynamically while parameters are extracted in the demodulation process continuously. Other options include using a power up calibration or periodic calibration.

The present invention may be applied, for example, to receivers, front-ends, transmitters, power amplifiers, PGA coupled and non-coupled transceivers.

Other methods and systems are also disclosed.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Particular embodiments in accordance with the invention will now be described, by way of example only, and with reference to the accompanying drawings in which like reference signs are used to denote like parts, and in which.

Corresponding numerals and symbols in the different figures and tables refer to corresponding parts unless otherwise indicated.

DETAILED DESCRIPTION OF EMBODIMENTS OF THE INVENTION

Although the invention finds particular application to post-distortion equalization, implemented, for example, in a receiver, it also finds application to other forms of distortion, such as pre-distortion and other forms of systems and devices, such as transmitters. Various embodiments are provided below. Various other embodiments of the invention will be apparent to persons skilled in the art upon reference to this description.

A method for digital equalization of non-linear distortion is provided herein. In an embodiment of the invention, the method is applied to equalization of third order harmonic intermodulation products where common conventional filtering usually cannot be performed utilizing a signal-processing algorithm.

In an embodiment, the invention utilizes the non-linear transfer function. The $2^{nd}$ order distortion is generally filtered in the analog front end and therefore the relevant a approximated non-linear transfer function, eliminating the $2^{nd}$ order element and the linear gain is as follows:

$$Y(X)=X+B_3 \cdot X^3$$

The linear gain may be eliminated in the algorithm if Automatic Gain Control (AGC) is applied to the signal, yielding a normalized $3^{rd}$ order distortion coefficient $B_3$. An disembodiment of the present invention eliminates the distortion by applying an approximated non-linear inverse function of Y (X) to the distorted signal, that is:

$$Y^{-1}(Z) \approx Z - B_3 \cdot Z^3.$$

Where the Z in this case is the distorted signal Y (X).

The result of the inverse function is therefore:

$$Y^{-1}(Y(X))=\{X+B_3 \cdot X^3\}-B_3 \cdot \{X+B_3 \cdot X^3\}^3 = X+B_3 \cdot X^3 - B_3 \cdot \{X3+3 \cdot X^2(B_3 \cdot X^3)+3 \cdot X(B_3 \cdot X^3)^2\} = X+B_3 \cdot X^3 - B_3 \cdot X^3 - 3 \cdot B_3^2 \cdot X^5 - 3 \cdot B_3^3 \cdot X^7 \approx X+O(X^5)$$

The approximation can be done if the signal level is in the nearly linear region since the high order powers of $B_3$ and X are negligible compared to the original distortion, which is in the order of $B_3 \cdot X^3$.

If a higher order approximation is taken, $$Y^{-1}(Z) \approx Z - B_3 \cdot Z^3 + 3 \cdot B_3^2 \cdot Z^5$$

The result of the inverse function is therefore:

$$Y^{-1}(Y(X))=\{X+B_3 \cdot X^3\}-B_3 \cdot \{X+B_3 \cdot X^3\}^3+3 \cdot B_3^2 \cdot \{X+B_3 \cdot X^3\}^5 = X+B_3 \cdot X^3 - B_3 \cdot \{X^3+3 \cdot X^2(B_3 \cdot X^3)+3 \cdot X(B_3 \cdot X^3)^2\}+3 \cdot B_3^2 \cdot \{X^5+5 \cdot X^4 \cdot B_3 \cdot X^3 + 10 \cdot X^3 B_3^2 \cdot X^6 + 10 \cdot X^2 B_3^3 \cdot X^9 + 5 \cdot X \cdot B_3^4 \cdot X^{12} + B_3^5 \cdot X^{15}\} = X+B_3 \cdot X^3 - B_3 \cdot X^3 - 3 \cdot B_3^2 \cdot X^5 + 3 \cdot B_3^2 \cdot X^5 + O(X^7) \approx X+O(X^7)$$

In FIGS. 4a, 4b, 4c and 4d and in the below calculations a baseband model is developed. This model may be used to facilitate understanding the below discussion of an embodiment of the distortion estimation mechanism of the present invention.

--- origianal_bb = i(t) + jq(t)
a = w$_c$t
x(t) = real((i + jq) · e$^{jwct}$) = icos a − qsina
x3(t) = i$^3$ cos$^3$ a − 3iq$^2$qcos$^2$ a sin a + 3iq$^2$ cos a sin$^2$ a − q$^3$ sin$^3$a
y(t)= x(t) + bx$^3$ (t)
bb(t) = 2y(t) · e$^{-jwct}$ = 2(x + bx$^3$)
(cos a − j sin a) = bb$_i$ + jbb$_q$
bb$_i$ = 2(x + bx$^3$)cos a =
bb$_i$ = 2(icos$^2$ a − q sin a cos a) + 2b(i$^3$ cos$^4$ a − 3i$^2$q cos$^3$ a sin a + 3iq$^2$ cos$^2$ a sin$^2$ a − q$^3$ cos a sin$^3$ a)
bb$_q$ = −2(x + bx$^3$)sin a =
bb$_q$ = −2(icos a sin aa − q sin$^2$ a) − 2b(i$^3$ cos$^3$ a sin a − 3i$^2$ q cos$^2$ a sin$^2$ a + 3iq$^2$ cos a sin$^3$ a − q$^3$ sin$^4$ a)
Fourier Series:

cos$^2$a ≈ 0.5 + 0.5 cos 2a
sin a cos a ≈ 0
sin$^2$ a ≈ 0.5 − 0.5 cos 2a
cos$^4$ a ≈ 0.375 + 0.5 cos 2a
cos$^2$ a sin$^2$ a ≈ 0.125
sin$^4$ a ≈ 0.375 − 0.5 cos 2a
cos$^3$ a sin a, cos a sin$^3$ a ≈ 0
After taking only the DC element due to LPF filtering, it gives:
bb$_i$ = 2(i · 0.5) + 2b(i$^3$0.375 + 3iq$^2$0.125)
bb$_q$ = −2(−q · 0.5) − 2b(−3i$^2$q0.125 − q$^3$0.375)
b$_2$ = 0.75b
finally:

bb$_i$ = i(1 + b$_2$(i$^2$ + q$^2$))
bb$_q$ = q(1 + b$_2$(i$^2$ + q$^2$))

---

With the assumptions that: 1) linear AGC is applied and 2) $2^{nd}$ order harmonic is removed thus having only $3^{rd}$ order harmonic in IF. The general expression is obtained that applies to baseband y=x·(1+b·|x|$^2$), suggesting that the larger the distance the symbol is from the center, the greater the effect of deviation of the symbol in the constellation from its original location.

The following analysis addresses correction of non-linear distortion based on side information on the distortion coefficients. This analysis, for example purposes, addresses the post distortion case.

The transformation function, for complex x and y, y=x·(1+b·|x|$^2$), is indeed reversible up to a certain amount, with two possible polynomial approximations derived in previous section ($Y^{-1}(Z) \approx Z - B_3 \cdot Z^3$ and $Y^{-1}(Z) \approx Z - B_3 \cdot Z^3 + 3 \cdot B_3^2 \cdot Z^5$)

$$x_{3rd\ order}=y \cdot (1-b_{estimated} \cdot |y|^2)$$

$$x_{5th\ order}=y \cdot (1-b_{estimated} \cdot |y|^2+3 \cdot b_{estimated}^2 \cdot |y|^4)$$

Figure 5:
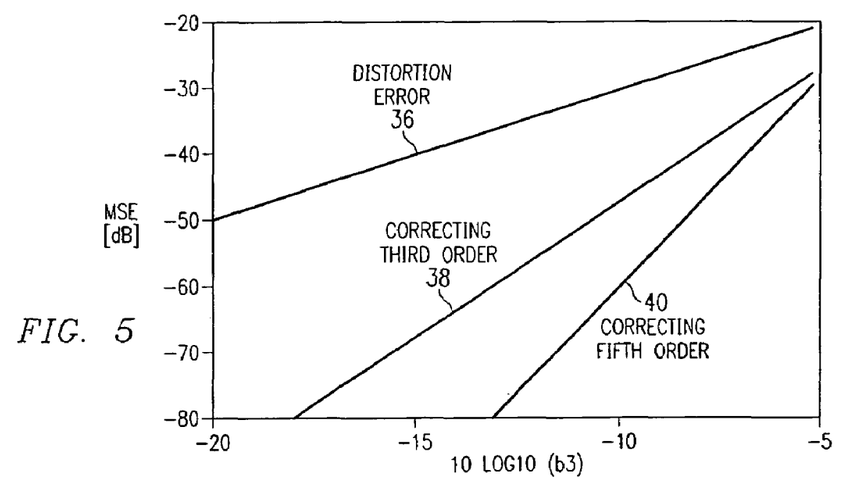
FIG. 5 illustrates the impact of distortion and exemplary error corrections.

FIG. 5 shows a comparison of the impact of the distortion, and the remained error after correcting it. FIG. 5 shows Mean Square Error (MSE) relevant to x of:

$Err_1 = y - x; 36;$ $Err_2 = x_{3rd\ order} - x; 38;$ $Err_3 = x_{5th\ order} - x; 40;$ FIG. 5 suggests that if $B_3$ is well estimated the MSE improvement is significant, e.g. for $3^{rd}$ order correction from −25 dB to −35 dB, −30 dB to −48 dB and −35 dB to −55 dB. FIG. 5 also demonstrates that the higher the original distortion the more limited is the correction.

The present invention is applicable even in the presence of high adjacent channels where the adjacent channel distortion is located within the demodulated signal bandwidth. The impact of adjacent channels (or non filtered signal in general) may be analyzed in 2 aspects (distortion equalization and sense mechanism).

Distortion Equalization: In an embodiment of the present invention, a distortion equalization mechanism applies an inverse or approximated inverse function to the signal. The inverse function makes the overall function approximately linear. In this example, the transfer function rather than the signal is manipulated. With this in mind, given the non-linear parameters as described above and applying the inverse function to the signal, the induced non-linear noise from adjacent channel on the main signal will be equalized also. Generalizing this idea, in an embodiment of the present invention, it is preferred to not filter the adjacent channels or other signals that induce non-linear noise on the main signal and apply the non-linear equalization on all the signals. This way the induced non-linear noise from the adjacent channels on the main signal can be removed too. This also implies that in any system having a sharp filtering, such as SAW filtering, in the RF/IF chain, the non-linear distortion of adjacent channels originating only from RF/IF chain following the filter can be removed. The main signal's distortion naturally is not filtered and therefore not limited to that section of chain.

Sense Mechanism: The adjacent channel is uncorrelated with the demodulated signal and therefore the distortion from it falls on top of the main signal, behaves as external noise or interference and doesn't impact the non-linear error estimation properties. It can make, as with other impairments, estimation more difficult but not impossible. As described above, the main signal distortion tends to compress the signal's constellation. This is derived from the basic property $y = x \cdot (1 + b \cdot |x|^2)$, described before. The induced non-linear noise from the adjacent signal is uncorrelated with the signal and therefore it behaves as general noise on the constellation.

In an embodiment of the present invention, the fundamental process estimates the distorted transfer function and applies an inverse or approximated inverse transfer function. The result is an approximately linear transfer function. There are 2 general cases: pre-distortion and post-distortion.

Figure 6A:
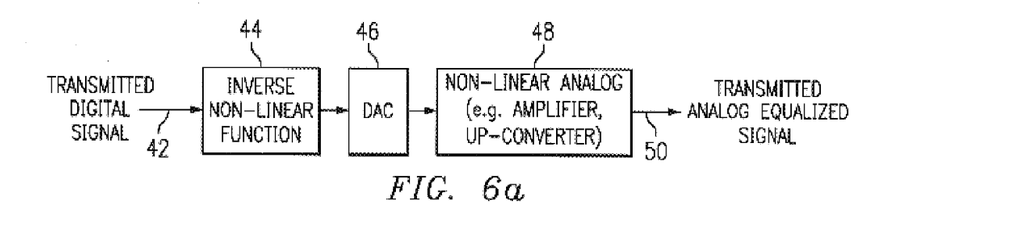
FIGS. 6a and 6b illustrate exemplary simplified block diagrams of pre-distortion and post-distortion approaches of embodiments of the present invention.
Figure 6B:
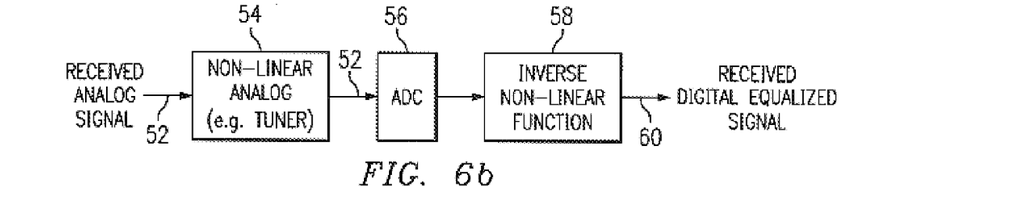

Post-Distortion: An embodiment of this case is described above. Referring to FIG. 6b, an embodiment of the present invention digitizes 56 the distorted signal 52, thus maintaining the distortion level. The signal is passed through an inverse non-linear transfer function 58 resulting in a non-distorted signal 60.

Pre-Distortion: Referring to FIG. 6a, in an embodiment of the invention pre-distortion may also be addressed. A digital pre-distorted signal 42 is generated and passed through an inverse non-linear transfer function 44, which is then converted 46 to an analog signal and passed through the non-linear analog transfer function 48, thereby resulting in an overall non-distorted signal 50.

The general pre and post-distortion embodiments of the present invention are described in FIGS. 6a and 6b. Using the same approximated inverse functions in pre and post-distortion does not necessarily produce the same equalization error. In general, shown in simulations for the $3^{rd}$ order distortion case, described previously, the error in pre-distortion grows more rapidly than that in post-distortion. This implies that the approximated inverse non-linear function in the pre and post-distortion cases can differ if optimization of error is considered.

The present invention is not limited to $3^{rd}$ order non-linearity equalization. In cases of wideband transmitters other orders such as $2^{nd}$, $4^{th}$, $5^{th}$, etc can be significant. Closing a loop on the transmitter signal and using pre-distortion (or post-distortion) with the approximated inverse function can reduce the high order non-linearity.

Some examples of the approximated inverse functions are provided below. In some cases an approximated inverse function is applied. In the $3^{rd}$ order distortion case a few of the possible functions are:

$Y^{-1}(Z) \approx Z - B_3 \cdot Z^3$—explained further above. This approximation requires only 1 parameter of the non-linear function $B_3$. This approximation becomes more and more inaccurate as the value of Z grows compared to $B_3$.

$Y^{-1}(Z) \approx Z - B_3 \cdot Z^3 + 3 \cdot B_3^2 \cdot Z^5$—explained further above. This approximation requires only 1 parameter of the non-linear function $B_3$. This approximation becomes more and more inaccurate as the value of Z grows compared to $B_3$.

In an embodiment of the present invention, it is also possible to use a table of the inverse function. Generally, this method gets close to the overall linear function. This method requires a table (and not 1 parameter) per setting of the non-linear parameter $B_3$. This method also requires knowledge of the input signal power.

Below a few general methods are described regarding the dynamics of the non-linear distortion equalization. The selection of method depends on the application, signal properties and system configuration. A few possible methods that may be used in the present invention include:

Continuous Equalization: This may apply to receivers, such as discussed above. The digitized signal is demodulated and the non-linear parameters are extracted in the demodulation process. The parameters are used to correct the distortion at the digital domain constantly.

Power Up Calibration: This may apply to systems where extracting the non-linear parameters from the signal passing through is difficult or non-efficient, or in cases where the non-linear parameters tend to be almost fixed (e.g. amplifier with insignificant non-linearity parameters changes over temperature and time). In such cases power up calibration may be used, with the original signal or a test signal to estimate the non-linear parameters. The parameters are fixed and used later in open loop.

Periodic Calibration: This may apply to systems where non-linear parameters tend to change slowly. In this case periodic estimation of the parameter may be done after initial power up calibration to fix the slowly changing parameters. This may also apply to cases where a burst signal exists. In such cases, the time period where the burst exist may be used for estimation, or in other cases the gap between bursts may be used for generating a test signal and calibration. This may be efficient for systems including a transmitter and receiver. In such a case the receiver may be used during transmission to estimate the non-linearity of the transmitter and fix it.

Below exemplary methods for sense mechanism (non-linear distortion estimation) of the present invention are provided. There are various embodiments to estimate the non-linear coefficient. In the case of the 3$^{rd}$ order distortion the coefficient to estimate is $B_8$.

Figure 7:
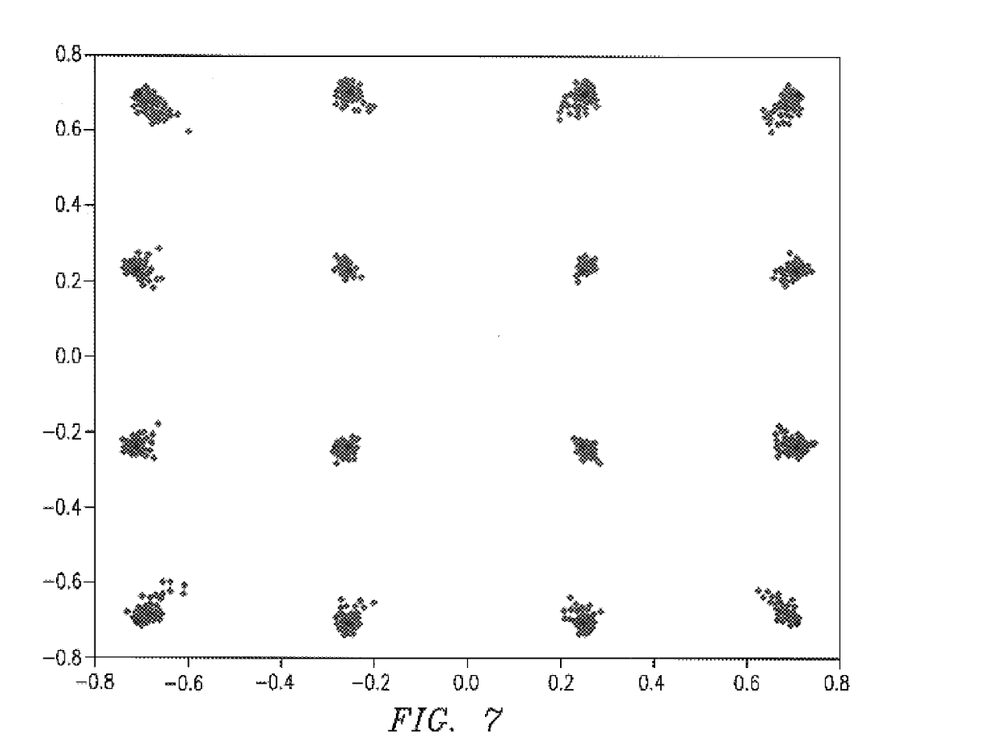
FIG. 7 illustrates non-linear $3^{rd}$ order distortion impact on a 16 QAM constellation.

Modulated Signal-Based Methods: The first set of methods to be discussed are applicable to systems where a demodulator exists. In this case, the present invention may be applied to digital signals where a linear AGC controls the digital gain in order to maintain a constant level signal constellation. An example of a 16 QAM signal with 3$^{rd}$ order distortion and the impact on the constellation is described in FIG. 7. An additional example showing both the distorted received constellation (green points) and the reference (ideal) constellation (red points) is described in FIG. 8 for a 1024 QAM signal. When no non-linear distortion exists, the constellation points (green points) will coincide with the ideal points (red points). If an Additive White Gaussian Noise (AWGN) is introduced, the averaging of the received constellation (green points) around each constellation point will also coincide with the ideal points (red points). However if a non-linear distortion exists, as in the discussed case, the received constellation points (green points) will tend to be shifted towards the axis origin due to compression in the high level input. The AGC will compensate for the compression, pushing the outer and inner constellation points (green points) outside. The inner (green) points' distortion is negligible, due to their low power. However their shift is dictated by the compression of the outer (green) points.

Figure 8:
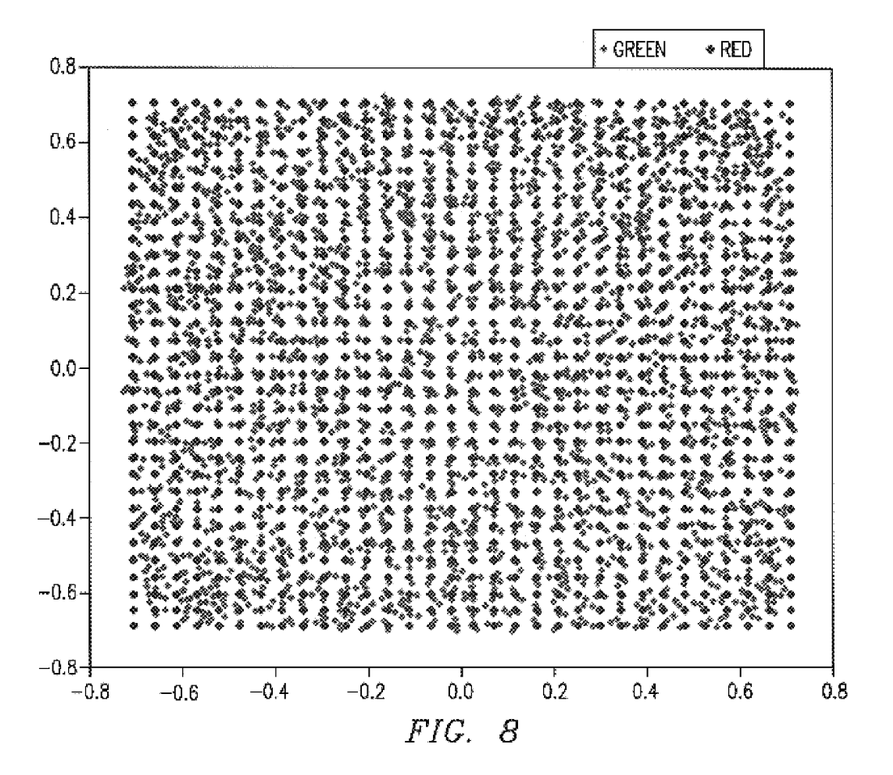
FIG. 8 illustrates non-linear $3^{rd}$ order distortion impact on a 1024 QAM constellation and a reference (ideal) 1024 QAM constellation.

Decision Directed Method: This method employs the fact that the linear AGC will tend to compensate for the non-linear compression of the outer (green) points of the constellation, thus shifting all constellation points (green points). In fact, linear AGC will converge the average power of the signal to be the average power of the reference constellation (red points), but the points will not coincide. The most outer (green) points will be pushed towards the origin, while others will be pushed outside to get overall average power maintained. In an embodiment of the present invention, additional non-linear slow AGC (slower than the linear AGC) is applied, measuring the shift of the constellation points (green points) while the linear AGC is converged. For example, in this case if the most outer (green) points are still shifted towards the origin, this means that there exists a non-linear distortion. If the inverse function was applied but the coefficient is estimated too low the overall non-linearity would still have the outer (green) points shifted towards the origin. This means that the coefficient should be increased. When estimated too high the overall non-linearity will have the outer (green) points shifted outside, thus indicating that the coefficient should be decreased.

In general, the displacement of the constellation points (green points) may be used as an error signal to drive a change in the distortion coefficient. Two closed loops are used, the first is the linear AGC and the second is the non-linear one. In an embodiment of the present invention, the time constant of the non-linear loop integrator is preferably set to be much higher then the linear one in order to achieve the required displacement.

Figure 9:
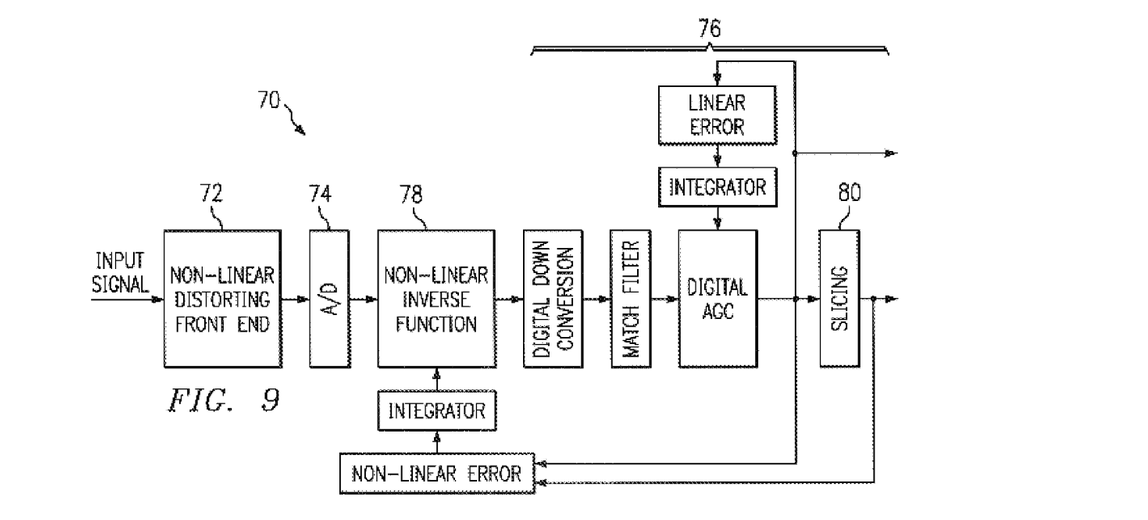
FIG. 9 illustrates a simplified block diagram of a decision directed approach of an embodiment of the present invention.

An example of a block diagram of a system 70 for a decision directed approach is described in FIG. 9.

The suggested decision directed approach is suitable for many digital signals having high constellation order. A decision directed approach is relevant because non-linear distortion in analog front ends is usually set to be much lower then the threshold signal to noise ratio, otherwise its contribution is not negligible. Generally, for almost negligible interference it is set to −15 dB below the AWGN. For example in the 256 QAM case where about 30 dB SNR is required, the distortion level target is about −45 dBc. This gives a wide region where intercept point can be reduced and then compensated with the present invention thereby reducing the overall power consumption of the system. The present invention can eliminate residual distortion. In an embodiment of the present invention, the nearly linear region is used, otherwise there may be other higher order distortions that may not be compensated. Furthermore, the inverse non-linear function approximation may not hold.

Figure 10:
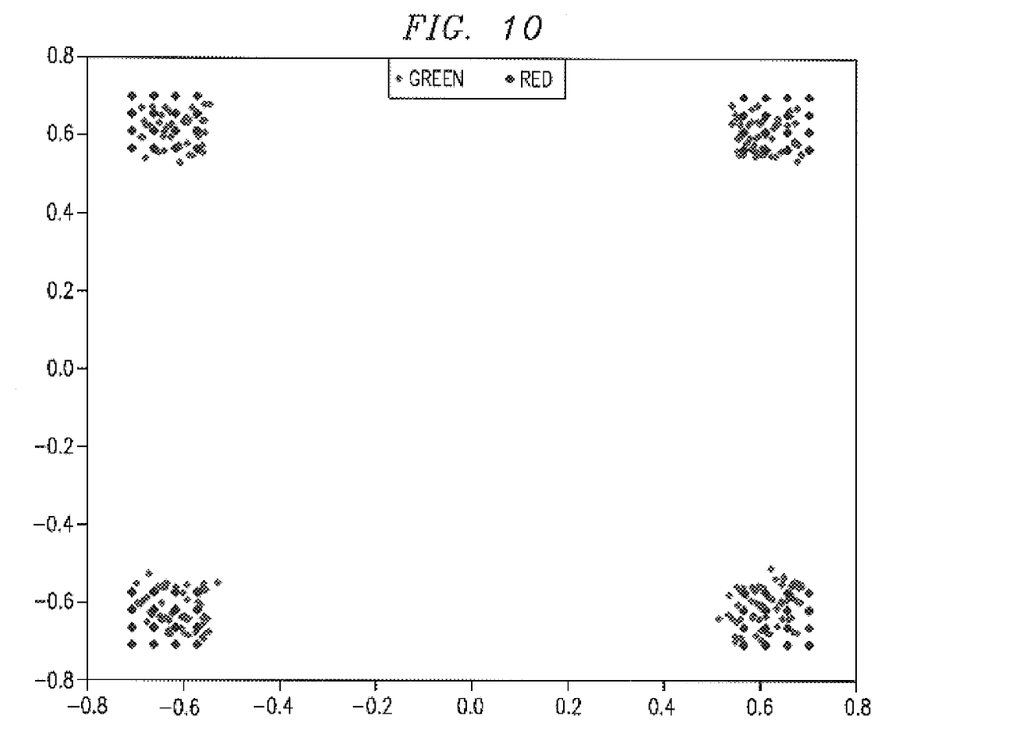
FIG. 10 illustrates distorted and ideal constellation corner points in a 1024 QAM constellation.

Non-Decision Directed Method: Referring to FIG. 10, corner constellation points (green points) in the 1024 QAM case indicate that in the existence of high non-linear distortion, decision errors in the slicer 80 may occur, thus reducing the effectiveness of the decision directed method described above. Below an embodiment of the present invention is provided that introduces a non-decision directed method that overcomes this effect.

In this method, the input power of the corners (green points) is compared to a known reference (red points). This means that averaging of the power of the outer points (green points) is done and compared to the average power of the outer points (green points) of the reference constellation (red points). Following is the gradient and the reference power to compare to:

$$corner\_grad = ref - |x|^2$$

$$ref = E(|a_{corners}|^2)$$

As seen in simulations, the non-decision directed method is very efficient in high order constellation cases such as 1024 QAM.

Another possible method that may be used in the present invention is combining the decision and non-decision directed methods. In this case, the initial convergence would be done in non-decision directed method. Gearshift is done later if needed to the decision directed when decision error is small enough. For example. If you have two processes sequentially you may shift from one to the next when a criteria is achieved. In an embodiment of the combined method of the present invention, the non-decision directed method may be used initially. Once the MSE goes below a known threshold a shift to the decision directed method may occur. In other embodiments gearshift may involve changing a parameter in an approach at a known point.

A non-linear polynomial estimation method may also be employed. In this method the constellation is used. The estimation of the non-linear parameter is done by estimating the deviation of the constellation points from the linear spacing. When no non-linear distortion exists, the spacing of QAM signal will be fixed. In the case of non-linear distortion, the constellation points will shift from linear spacing, according to the distance from the origin. As previously derived the points will follow the property $y = x \cdot (1 + b \cdot |x|^2)$. In that case the coefficient b, can be estimated by looking at the points' spacing.

Other methods can be used for coefficient estimations such as introducing a test signal, such as a sine wave in a transmitter and measuring the harmonics. An approach in this case will be a closed loop, setting the pre-distortion coefficient, to minimize the output harmonics.

Some exemplary applications for the pre and post-distortion equalization of the present invention include:

Receivers: The present invention may be applied to receivers. An embodiment of such an application is described above. For example, the present invention can be applied to broadband receivers such as cable modem, WLAN, DSL etc. In many broadband applications high order constellations are utilized, thus having difficult specifications for the non-linear distortion.

Transmitters: The present invention may also be applied to transmitters, where low distortion in the adjacent channels is required. The transmitter output can be used for distortion coefficient estimation that is used to feedback to the transmitter digital mapper to have the inverse distortion, resulting in lower transmitter amplifier power requirements.

Power Amplifiers: This is a specific case of a transmitter. Typical applications are QAM transmitters, Cable modem upstream transmitters, WLAN.

Coupled Transmitters and Receivers: A typical such case is WLAN transceiver. In this case the transmitter and receiver are integrated, meaning at least the integration of analog parts or receiver and transmitter and digital parts of them. In this specific case, the transmission is normally done in half duplex. The receiver can be enabled while transmission occurs, to demodulate the coupled back signal and estimate the non-linear coefficient of the transmitter. The estimated coefficient in the receiver demodulator can be feedback to the transmitter for pre-distortion. This can improve the transmitter linearity.

Other: A system consisting of other non-linear modules can take advantage of the present invention to correct this impairment. This may include ADCs, DACs etc.

In a form of the present invention methods and systems for digital equalization of non-linear distortion is provided. An exemplary system may include a non-linear analog module and a digital core. The digital core may be used to implement an inverse or approximated inverse function of the non-linear analog transfer function to equalize the non-linearity of the analog module, thus yielding overall approximated linear system performance. The digital inverse function can be, for example, an approximated polynomial of the accurate inverse function or a table approximating the inverse function.

The digital equalization can be done, for example, with pre-distortion or post-distortion depending on the application and system. In case of receivers the post-distortion is more common, while in transmission systems and power amplifiers, pre-distortion is more common. The distortion equalization can be applied to $3^{rd}$ order distortion as well as other order (e.g. $2^{nd}$, $4^{th}$, $5^{th}$ orders).

The estimation of the parameters for the inverse function (or approximated one) can be done, for example, using a test signal or the original modulated signal. In case of receivers or coupled transmitter and receiver, the demodulator can be used to extract the non-linear parameters, thus yielding the inverse function parameters. In transmitter case without coupled receiver, the transmitted analog signal can be feedback to implement a simplified demodulator to extract the non-linear parameters or a special function such as harmonic estimator to extract the non-linear parameters.

The estimation can be done dynamically while parameters are extracted in the demodulation process continuously. Other options include using a power up calibration or periodic calibration. In the last 2 cases, the analog module dynamic specifications, such as non-linearity vs. temperature can be optimized or specified to reduce overall error due to non-continuous parameter estimation.

The estimation can also be done in systems with, for example, distortion from adjacent channels due to no correlation between the signal and the induced non-linear noise from the adjacent channels on the main signal. In an embodiment of the present invention other signals such as adjacent signals are not filtered in order to equalize non-linearity induced on the main signal by such other signals.

The present invention may be applied, for example, to receivers, front-ends, transmitters, power amplifiers, PGA coupled and non-coupled transceivers.

Referring to FIG. 9, as an example, in an embodiment of the present invention, a receiver system is provided that includes a non-linear analog module 72 such as analog front-end and a digital core 76 may be used. The digital core 76 following a digitizing module (ADC) 74, implement an inverse or approximated inverse function of the non-linear analog transfer function to equalize the non-linearity of the analog module, thus yielding overall approximated linear system performance.

The digital inverse function yielding the non-linear equalization can be done various ways. For example, an approximated polynomial of the accurate inverse function or a table approximating the accurate inverse function may be used. In the case of $3^{rd}$ order distortion, with analog front-end module transfer function $y=z+bz^3$, where b is negative, the polynomial approximations include: $y=z-bz^3$ and $y=z-bz^3+3bz^5$. Other order approximations y (z) can be used to the approximate the accurate formula: y $(z)+b \cdot y^3$ $(z)=z$. The distortion equalization can be applied to $3^{rd}$ order distortion. Other orders can be equalized in similar methods.

Estimation may done by inserting an inverse function (or an approximated one) 78 following the digitizing module (ADC) 74, demodulating the signal and extracting the overall system (analog module and digital inverse function) non-linear parameters and correcting the inverse parameter until convergence is achieved with overall approximately linear performance system.

Methods of estimation include decision directed, non-decision directed and a combination of the two. In an embodiment of a decision directed method: linear digital AGC is utilized maintaining a fixed average constellation power and a second non-linear digital AGC, measuring the displacement of the constellation points while average power is maintained. This approach yields an error signal to increase or decrease the inverse function non-linear parameter. The non-linear AGC usually has a slower time constant than the linear AGC. In a non-decision directed method the corner points input power $|z|^2$ of the constellation are compared to a known reference constellation power (ref), yielding an error signal to increase or decrease the inverse function non-linear parameter. A combined non-decision directed and decision directed method with gearshift may also be used.

The constellation deviation from the linear spacing due to non-linearity may also be estimated. The non-linear parameter b may be estimated since the deviation follows the property: $y=x \cdot (1+b \cdot |x|^2)$.

The estimation and equalization can be done in the presence of adjacent channels also, due to no correlation between the signal and the induced non-linear noise from the adjacent channels on the main signal. In an embodiment of the present invention, other signals such as adjacent signals are not filtered to equalize the non-linearity of such signals induced on the main signal.

Figure 11:
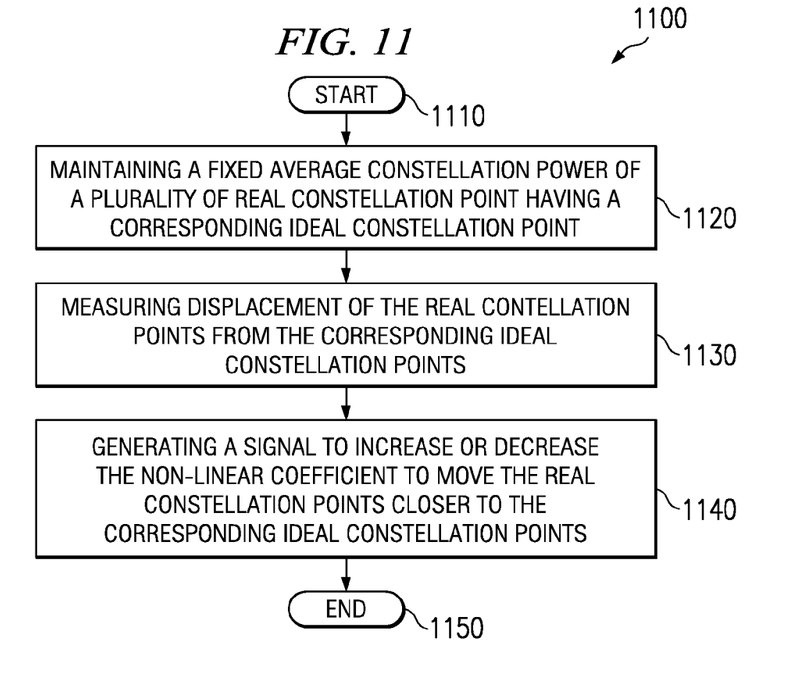
FIG. 11 is a flowchart illustrative of a method in accordance with an embodiment of the invention.

A method in accordance with an embodiment is shown in FIG. 11. Method 1100 Starts at 1110. A fixed average constellation power of a plurality of real constellation points is maintained at 1120. Each of the real constellation points has a corresponding ideal constellation point. At 1130, the displacement of the real constellation points from the cor responding ideal constellation points is measured. 1140 A signal to increase or decrease the non-linear coefficient to move the real constellation points closer to the corresponding ideal constellation points is generated at 1140. The method ends at 1150.

Figure 12:
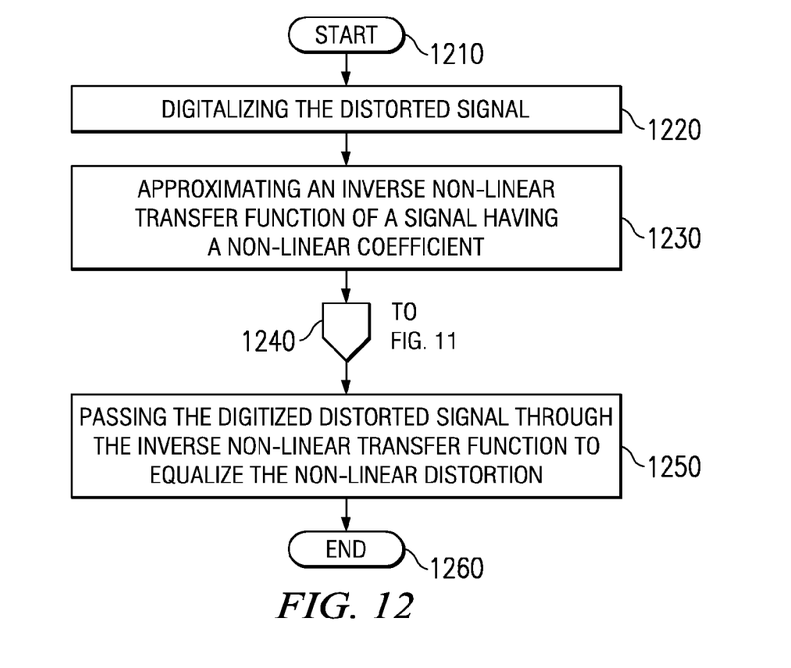
FIG. 12 is a flowchart illustrative of a method in accordance with another embodiment of the invention.

A method in accordance with another embodiment is shown in FIG. 12. At 1220 the distorted signal is digitized. An inverse non-linear transfer function of a signal having a non-linear coefficient is approximated at 1230. The method shown in FIG. 11 is perform at 1240. The digitized distorted signal through the inverse non-linear transfer function is passed to equalize the nonlinear distortion at 1250. The method ends at 1260.

While the invention has been described with reference to illustrative embodiments, this description is not intended to be construed in a limiting sense. Various other embodiments of the invention will be apparent to persons skilled in the art upon reference to this description.

It is therefore contemplated that the appended claims will cover any such modifications of the embodiments as fall within the true scope and spirit of the invention.

What is claimed is:

1. A method for digitally approximating an inverse non-linear transfer function of a signal having a non-linear coefficient comprising:
   maintaining a fixed average constellation power of a plurality of real constellation points each real constellation point having a corresponding ideal constellation point;
   measuring displacement of the real constellation points from the corresponding ideal constellation points; and
   generating a signal to increase or decrease the non-linear coefficient to move the real constellation points closer to the corresponding ideal constellation points.

2. The method of claim 1 wherein said method is repeated until the real constellation points and the corresponding ideal constellation points are at or near the same location.

3. The method of claim 1 wherein measuring displacement of the real constellation points from the corresponding ideal constellation points is done only for the real constellation points and the ideal constellation points in the corners of the constellation.

4. The method of claim 1 further comprising:
   repeating the method until the real constellation points and the corresponding ideal constellation points are near the same location; and
   repeating the method wherein the step of measuring displacement of the real constellation points from the corresponding ideal constellation points is done only for the real constellation points and the ideal constellation points in the corners of the constellation.

5. A method for equalization of nonlinear distortion in a distorted signal comprising:
   digitizing the distorted signal;
   approximating an inverse non-linear transfer function of a signal having a non-linear coefficient comprising:
      maintaining a fixed average constellation power of a plurality of real constellation points each real constellation point having a corresponding ideal constellation point;
      measuring displacement of the real constellation points from the corresponding ideal constellation points;
      generating a signal to increase or decrease the non-linear coefficient to move the real constellation points closer to the corresponding ideal constellation points; and
      passing the digitized distorted signal through the inverse non-linear transfer function to equalize the nonlinear distortion.

6. A communication system comprising:
   a first non-linear analog module having a non-linear analog transfer function;
   a digitizing module coupled to the analog module;
   a digital module coupled to the digitizing module wherein the digital module comprises one or more equalizing modules to generate an inverse function of the non-linear analog transfer function modeled in a nearly linear region to equalize non-linearity of the analog module, said digital module further comprising:
      a linear digital Automatic Gain Control (AGC) module operable to maintain a fixed average constellation power of a plurality of real constellation points wherein each real constellation point having a corresponding ideal constellation point;
      a second non-linear digital Automatic Gain Control (AGC) module operable to measure a displacement of the real constellation points from the corresponding ideal constellation points while a fixed average constellation power is maintained and
      digital module further operable to generate a signal to increase or decrease the non-linear coefficient to move the real constellation points closer to the corresponding ideal constellation points.

7. The system of claim 6 wherein the communications system is a receiver.

8. The system of claim 6 wherein the communications system is a transmitter.

9. The system of claim 6 wherein the communications system is a transceiver.

10. The system of claim 6 wherein the equalization of the non-linearity of the analog module occurs based on a set condition.

11. The system of claim 6 wherein the equalization of the non-linearity of the analog module occurs continuously.

* * * * *